United States Patent Office 2,981,745
Patented Apr. 25, 1961

2,981,745
MANUFACTURE OF P-UREIDOBENZENEARSONIC ACID

Geza Szabados Delmar, Lachine, Quebec, Canada, assignor, by mesne assignments, to Whitmoyer Laboratories, Inc., Myerstown, Pa., a corporation of Delaware No Drawing. Filed Jan. 25, 1960, Ser. No. 4,234

3 Claims. (Cl. 260—443)

This invention relates to a process for making p-ureidobenzenearsonic acid, said compound being represented by the following formula:

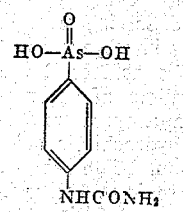

Several methods have heretofore been described for the production of p-ureidobenzenearsonic acid, the compound which is the subject matter of my invention. Of those methods only one has gained any practical importance, this method being described in German Patent No. 213,155 of 1907. In Example 1 of this German patent the process is described as follows:

"620 grams of sodium arsanilate are dissolved in 3.6 liters of cold water, 480 grams of potassium cyanate are added, and after this has dissolved, 480 cc. of acetic acid are added and the mixture allowed to stand at room temperature for 24 hours. Then the solution is acidified with 1560 cc. of hydrochloric acid (specific gravity 1.124) and crystallization is initiated by scratching the walls of the container. After standing for several hours, the crystals are filtered, washed with water to free them from hydrochloric acid, and dried."

While that process has been the most practical of those described in the literature, I have found, investigating it, that it is far from satisfactory. The yields obtained are erratic and the better yields occasionally obtained are difficult to duplicate from one time to the next. Worse still, the quality of the product (p-ureidobenzenearsonic acid) so obtained leaves much to be desired, because it contains from batch to batch variable but always significant amounts of unwanted arsanilic acid. Even though p-ureidobenzenearsonic acid is a compound listed and described in the United States Pharmacopeia (U.S.P. XV), this compound being also referred to in the U.S.P. as Carbarsone, there is no test listed therein for determining the presence and content, if any, of arsanilic acid in the product, despite the fact that it would be logical to expect arsanilic acid as an impurity due to the circumstance that arsanilic acid is often the starting material for the preparation of p-ureidobenzenearsonic acid. Yet, the presence of arsanilic acid in the compound intended as a medicinal is very objectionable because of the toxic properties of arsanilic acid. And, although the U.S.P. describes a method for assay of p-ureidobenzenearsonic acid, it is based upon the determination of arsenic (As) and this method would include all arsanilic acid present as an impurity. The molecular weight of arsanilic acid being 217 as against 260, the molecular weight of p-ureidobenzenearsonic acid, the presence of 5% or even 10% of arsanilic acid would hardly be noticed.

I have found that arsanilic acid as an impurity in p-ureidobenzenearsonic acid may be readily and accurately determined by a method described in the "Journal of Pharmacy and Pharmacology," vol. 2 (1950), pp. 98–100. This method takes advantage of the free amino group in arsanilic acid, which can be diazotized, and the diazocompound coupled with N-naphthyl-ethylene-diamine to produce a dye, the quantity of which can be determined spectrophotometrically. I have investigated this assay method thoroughly with arsanilic acid alone and also by adding known quantities of arsanilic acid to samples of p-ureidobenzenearsonic acid. The method has been proved to be very reliable.

Using this method of assay on many samples of p-ureidobenzenearsonic acid prepared from time to time by the method of the above mentioned German Patent No. 213,155, I have found that the samples do indeed contain variable amounts of arsanilic acid, but always significant amounts. The best examples of the product produced according to the method of the German patent contained unwanted arsanilic acid in an amount of 3% to 5%. This amount as an impurity in the compound is objectionable. In some instances I found as much as 10% to 15% of arsanilic acid in the p-ureidobenzenearsonic acid product made according to the German patent referred to.

Furthermore, the purification of p-ureidobenzenearsonic acid to remove unwanted arsanilic acid present as an impurity is not easy. The solubility of arsanilic acid is very close to that of p-ureidobenzenearsonic acid in hot and cold water, as well as in organic solvents. Both are soluble in alkalis. From alkaline solutions both can be precipitated with acids. Since the arsanilic acid is present only in a proportion of 3% to 15%, recrystallization from hot water will yield a more nearly pure p-ureidobenzenearsonic acid and on repeated recrystallization a relatively pure product (less than 1% arsonilic acid present) may be produced. But these operations are time-consuming and result in very considerable losses in yield (up to 50%).

It is an object of my invention to provide a method of making p-ureidobenzenearsonic acid which will be reliably uniform from batch to batch and which will yield a product of exceptional purity in every batch. Moreover, my method is simpler and cheaper, because smaller quantities and cheaper chemicals may be used.

According to my invention arsanilic acid itself is reacted with potassium cyanate under conditions which produce a better yield than the prior art methods wherein the sodium salt (or like salt) of arsanilic acid is used for the reaction with potassium cyanate. According to my method arsanilic acid is dissolved in an aqueous solution of potassium cyanate in an amount to react stoichiometrically while meantime maintaining the mixture cool. The dissolving reaction is an exothermic process and the solution is cooled, either by circulating a cooled solution in a jacket around, or in coils within, the reaction vessel, or simply by adding ice, to the solution until its temperature drops to 4° C. Then hydrochloric acid is added while stirring the solution and meanwhile keeping the temperature below 10° C. Hydrochloric acid is added in sufficient amount to bring the solution to a pH between 2.3 and 2.7 making certain that the pH remains in this range even after stirring the solution for an hour. By this time the p-ureidobenzenearsonic acid will have formed and becomes precipitated. After the product has precipitated, it is filtered by centrifugal, or filter press, or other suitable means, and then water washed and dried. The p-ureidobenzenearsonic acid so produced is of very high purity and the yield is 90% or better.

Although the novel features which are believed to be characteristic of my invention are pointed out in the annexed claims, the invention itself as to its objects and advantages and the manner in which it may be carried out may be better understood by reference to the following specific example of the production of a typical batch of p-ureidobenzenearsonic acid according to my method.

*Example*

Potassium cyanate in the amount of 210 pounds was dissolved with stirring in 160 gallons of water to which ice was added to bring the temperature down to 4° C. Then 300 pounds of arsanilic acid were added to the cold potassium cyanate solution and upon continued stirring the arsanilic acid was dissolved in the solution. Hydrochloric acid (Sp. Gr. 1.16) was then stirred into the solution in portions, while additional ice was also intermittently added to maintain the temperature of the mixture below 10° C. Hydrochloric acid was added in this manner until the pH of the resultant solution was brought to 2.5. This required about 400 pounds of hydrochloric acid. After continued stirring of the mixture for an additional hour, the precipitated crystalline product was filtered, washed with water, and dried. The yield was 328 pounds or a 92% yield. An assay of the product according to the method of the U.S.P. XV (referred to in the foregoing) showed the product to be 99.1% p-ureidobenzenearsonic acid. And a test conducted for arsanilic acid (according to the method referred to in the foregoing) showed a content of less than 1% arsanilic acid.

The terms and expressions which have been employed herein are used as terms of description and not of limitation, and there is no intention, in th use of such terms and expressions, of excluding any equivalents of the features shown and described or portions thereof, but it is recognized that various modifications are possible within the scope of the invention claimed.

What is claimed is:

1. A method of making p-ureidobenzenearsonic acid which comprises dissolving arsanilic acid in an aqueous solution of potassium cyanate in an amount to react stoichiometrically meanwhile maintaining the mixture cool, then gradually adding to the cooled mixture sufficient hydrochloric acid to bring the pH to between about 2.3 and 2.7 and meanwhile maintaining the mixture cool, thereby to cause p-ureidobenzenearsonic acid to precipitate, then filtering, water washing and drying the precipitated product.

2. A method of making p-ureidobenzenearsonic acid which comprises dissolving arsanilic acid in an aqueous solution of potassium cyanate in an amount to react stoichiometrically, then while maintaining said mixture at a temperature below 10° C. adding to it gradually sufficient hydrochloric acid to bring the pH of the solution to between 2.3 and 2.7 thereby to cause the formation of p-ureidobenzenearsonic acid and letting the cooled resulting mixture stand sufficient time to precipitate said p-ureidobenzenearsonic acid and then filtering, water washing and drying said precipitated product.

3. A method of making p-ureidobenzenearsonic acid which comprises dissolving arsanilic acid in an aqueous solution of a potassium cyanate in the proportion of 300 pounds of arsanilic acid to 210 pounds of potassium cyanate in 160 gallons of water and while maintaining said solution at a temperature below 10° C. gradually adding sufficient hydrochloric acid to bring the pH of the solution to about 2.5 thereby causing a precipitate of p-ureidobenzenearsonic acid to be formed, and then filtering, water washing and drying the precipitated product.

References Cited in the file of this patent

UNITED STATES PATENTS

| 937,929 | Ehrlich et al. | Oct. 26, 1909 |

FOREIGN PATENTS

| 293,152 | Great Britain | July 5, 1928 |